Nov. 13, 1951  P. C. RENNER  2,575,295
RADIOGRAPHIC APPARATUS
Filed May 20, 1949  2 SHEETS—SHEET 1
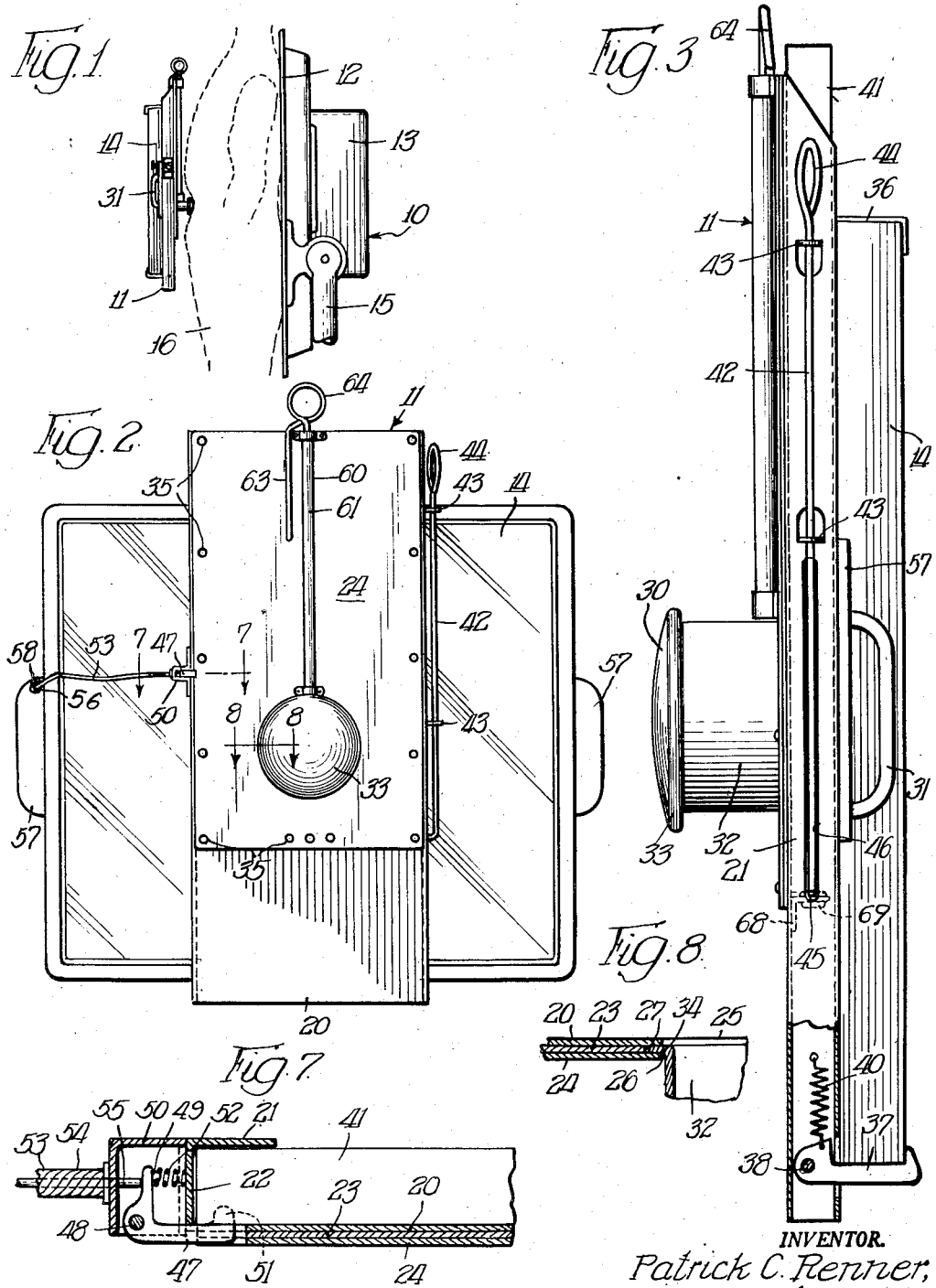
INVENTOR.
Patrick C. Renner,
BY

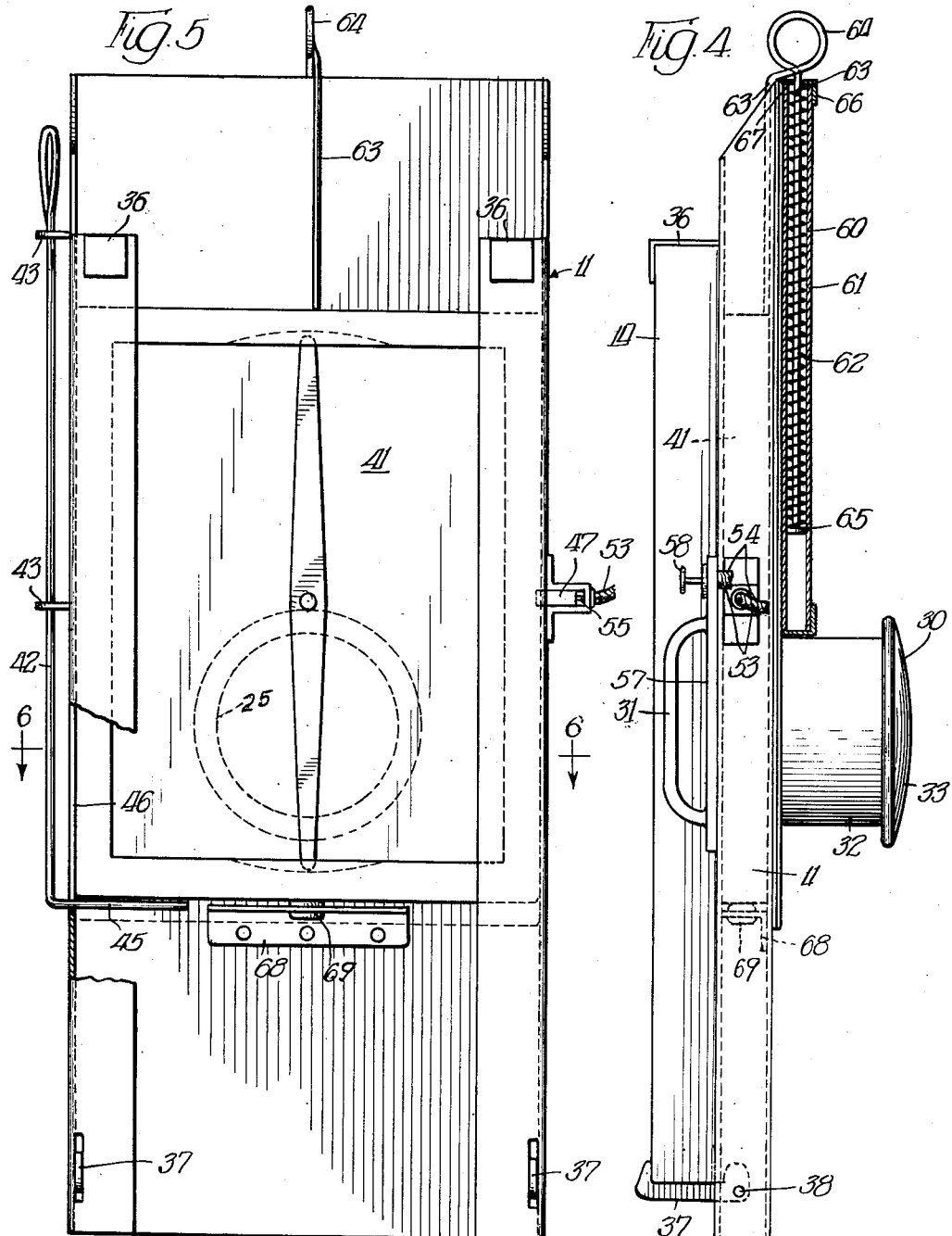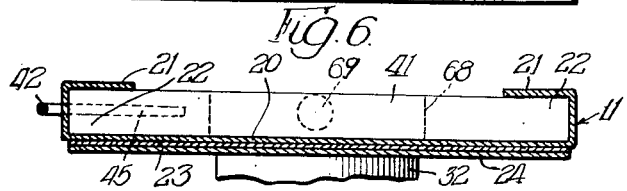

Patented Nov. 13, 1951

2,575,295

UNITED STATES PATENT OFFICE 2,575,295

RADIOGRAPHIC APPARATUS

Patrick C. Renner, Chicago, Ill.

Application May 20, 1949, Serial No. 94,434

8 Claims. (Cl. 250—66)

This invention relates generally to radiographic apparatus and more particularly to an improved cassette holder intended primarily for use in making photographs with X-ray machines equipped with fluoroscopic screens where it is desired to make X-ray photographs in conjunction with fluoroscopic examinations.

In making fluoroscopic examinations of patients, particularly in the case of gastro-intestinal diagnosis or examination, it is frequently desirable to take X-ray photographs of what appears on the fluorescent screen in order to have a permanent record for subsequent study, or to secure a more detailed representation of conditions within the patient's body than is available with a fluorescent screen alone. In other cases, particularly where organs which are in motion are being examined, it is desirable to have a still picture which may be subsequently studied.

In the past, the usual technique has been to first perform a fluoroscopic examination and then to make X-ray photographs as a separate operation, either after completion of the fluoroscopic examination or at intervals during the examination, by removing the fluoroscopic screen and substituting a cassette containing a photographic film or plate. The photosensitive film or plate is enclosed in a lightproof cassette to prevent its exposure to light, the cassette being transparent to X-rays. The usual practice is to support a piece of photographic film between sheets of a fluorescent material which is activated by X-rays. Thus, exposure time required is reduced, for the film is exposed to light waves from both sides as well as to the X-rays.

In some instances, photographic cassette holders have been provided which were supported on the fluoroscopic screen and used to obtain photographs. But these holders have not proved satisfactory, for they were cumbersome and difficult to use, the moving of the cassette into position for exposure being an awkward manual operation.

Accordingly, one object of this invention is to provide a cassette holder which may be supported on the fluorescent screen during the fluoroscopic examination and which makes it possible to move the film immediately into position for exposure when the conditions observed on the screen are deemed to be satisfactory for photographing.

A further object is to provide a cassette holder which supports the cassette behind a shield which is impervious to X-rays so that it will not be exposed even to the relatively weak radiation used for the fluoroscopic examination, provision being made to move the film cassette rapidly from the shielded position to a second unshielded exposure position when it is desired to expose the film.

A further object is to provide a film holder which indicates to the person making the examination exactly what area will be photographed and which provides for immediate movement of the film cassette to this area when an actuator button associated with one of the handles used for positioning the fluorescent screen is pressed.

A further object of this invention is to provide a film holder for attachment to the patient's side of a fluorescent screen having a surface thereon which may be pressed against the patient's body to displace the organs and tissues from their normal positions and thereby facilitate the fluoroscopic or photographic examination of particular parts of the body by preventing their being obscured by other parts and further by reducing the body thickness which must be penetrated by the X-rays decreasing the exposure time.

A further object is to provide a device which is light in weight and which may be readily and securely attached to the fluorescent screen so as to be usable regardless of whether the patient is standing erect or lying upon a horizontal or inclined examination table.

Another object is to provide a device in which a single film cassette may be used for more than one exposure and which provides for ready removal and replacement of the cassette after exposure.

Other objects and advantages of the apparatus of this invention will of course present themselves to those familiar with the art on reading the following specification in conjunction with the drawings and the appended claims.

In the drawings:

Fig. 1 is a side view showing the manner in which a preferred embodiment of the cassette holder of this invention is used with a conventional X-ray apparatus;

Fig. 2 is an elevation taken from the patient's side showing the cassette holder supported on the fluorescent screen;

Fig. 3 is an enlarged side view of the cassette holder and the fluorescent screen;

Fig. 4 is a side view, partially in section, of the holder and fluorescent screen, taken from the opposite side;

Fig. 5 is an elevation of the side of the holder which lies adjacent to the fluorescent screen when it is mounted thereon;

Fig. 6 is a horizontal section taken on line 6—6 of Fig. 5;

Fig. 7 is a horizontal section taken on line 7—7 of Fig. 2; and

Fig. 8 is a horizontal section taken on line 8—8 of Fig. 2.

A conventional X-ray apparatus 10 equipped with a preferred embodiment of the cassette holder 11 is shown in Fig. 1. The apparatus 10 comprises a table 12, an X-ray generator 13 and a fluorescent screen 14. The table 12 and the X-ray generator 13 are rotatably supported on an upright element 15 in such manner that the table 12 may be rotated through any desired angle from the vertical position shown to a horizontal position, and the X-ray generator 13 moved to various positions along the table so as to project radiation through various parts of the patient's body 16. Thus, any part of the patient's body may be examined either when he is standing erect against the table 12 or is reclining thereon when the table is horizontal or at an angle.

The fluorescent screen 14 is movably supported on trunnions carried by a yoked pivoted arm in the conventional manner so as to be freely movable to any desired position. In order to simplify the drawings the mechanism for supporting the screen 14 has not been shown.

A fundamental concept of the cassette holder 11 of this invention is to mount a shield plate, formed of material which is impervious to X-rays and which has an opening therein through which X-rays may pass, between the fluorescent screen 14 and the patient's body 16. A pair of slideways is provided for movably supporting a film cassette behind the plate in such fashion that it may be rapidly moved from a shielded position behind the solid part of the shield plate to a second position wherein a portion of the photographic film is disposed directly behind the opening so that it may be exposed.

The preferred form of holder 11 comprises a rectangular frame 20, preferably formed from sheet aluminum for lightness and having its sides 21 bent rearwardly and inwardly to define a pair of parallel slideways 22, a lead shield 23 and a protective plate 24 covering the lead shield. The length of the frame 20 is somewhat in excess of the height of the fluorescent screen 14, and the width of the frame 20 is determined by the width of the film cassette with which it is to be used.

The frame 20 and the protective plate 24 are provided with concentric round openings 25 and 26, respectively. These openings preferably are of the same diameter, as shown in Fig. 8, and are disposed approximately at the center of the screen 14. The lead plate 23 is provided with a similarly located but slightly larger opening 27. These are the openings through which the photograph is made.

A pressure element 30 is supported on the patient's side of the frame 20 and projects outwardly a slight distance from the plate 24. The pressure element 30 is used to manipulate the patient's body 16 to reduce its thickness and bring particular organs into view. To use the element 30, the physician or technician exerts an inward pressure on the two handles 31 provided on the sides of the screen 14. This pressure is transmitted to the element 30 causing it to be pressed into the patient's abdomen to reduce the thickness which must be penetrated by the X-rays and push other organs or tissues to the side so that the desired part of the body may be viewed on the screen 14 or photographed. The distension made possible by the pressure element is particularly advantageous when organs such as the duodenum or colon are to be examined which tend to telescope and obscure themselves.

In the embodiment shown, the element 30 comprises a cylindrical tube 32 and a rounded wooden plug 33 received in the end of the tube. The plug 33 may be formed of plastic or other material which is transparent to X-rays, but wood is preferred because it is easy to form and keep clean and is warm to the touch when pressed against the patient's body.

The tube 32 is preferably formed from aluminum and is provided with a right angle flange 34 at the opposite end from the plug 33. This flange is received in the annular opening between the frame member 20 and the cover plate 24 which results because the hole 27 in the lead shield 23 is larger than the holes 25 and 26 in the frame 20 and cover plate 24.

The pressure element 30 is preferably assembled to the frame 20 by first passing the tube 32 through the opening 26 in the cover plate 24. The lead plate 23 is next laid on the plate 24 so that the opening 27 surrounds the flange 34. The subassembly is then placed adjacent to the frame 20 and secured by the rivets 35 (Fig. 2) which pass through the frame 20, shield 23 and plate 24.

After the tube 32 has been attached to the frame 20, the wood plug 33 is installed by driving it into the end of the tube 32. The plug 33 is preferably made of such size as to be retained in the end of the tube 32 by friction when it has been driven home, or it may be cemented in place. The use of conventional fasteners driven into the plug 33 is undesirable for they would cast a shadow on the fluorescent screen 14 or photograph.

The film holder 11 is supported on the fluorescent screen 14 by two fixed hooks 36 at the top end and two movable hooks 37 at the lower end. As shown in Figs. 4 and 5, the upper hooks 36 are preferably formed integrally with the bent over side portions 21 of the frame 20. The lower hooks 37 are pivotally attached to the frame 20 by rivets 38 extending through the sides. A coil spring 40 housed within each of the slideways 22 exerts an upward force on each of the lower hooks 37 urging them to assume the position shown in Fig. 3 to lock the film holder 11 to the screen 14 when it is mounted thereon. The film holder 11 is released by moving the hooks 37 downwardly, swinging the lower end away from the screen until the hooks 37 are clear and lifting upwardly to unhook the upper hooks 36.

The film cassette 41 is received in the slideways 22 by inserting it in the top thereof and, after insertion, is freely movable therein. In Figs. 4 and 5 the cassette is shown in the position which it occupies during exposure, while in Fig. 3 it is shown in the shielded upper position behind the solid part of the lead plate 23. Upward movement of the cassette 41 is effected by means of a return rod 42 which is supported in ears 43 formed by bending portions of the frame 20 outwardly and piercing them to provide bearing openings for the rod 42. The upper end of the rod 42 is bent to form a convenient hand loop 44, and the lower end 45 is bent at right angles so as to project inwardly into the frame to a position beneath the cassette 41, a slot 46 being provided in the side of the frame through which the end of the rod 42 extends. To lift the cassette the operator merely lifts upwardly on the handle 44 which extends to an accessible position above the top of the fluorescent screen 14. As the rod 42 is moved upwardly the bent over end 45 lifts the cassette 41. The length of the frame 20 is such that the top of the cassette 41 projects slightly above the top thereof when in the shielded position so as to be readily removable. The cassette 41 is removed simply by grasping the top edge and lifting.

After insertion the cassette 41 is retained in the shielded position by a hinged pawl 47 (Fig. 7). This pawl is pivotally mounted on a pin 48 which is carried by a bracket 50 attached to the side of the frame 20. The pawl 47 has a projection 51 on the inner end thereof which normally rests in the position shown in Fig. 7 projecting into the slideway 22 and preventing movement of the cassette 41 to the unshielded position. Since the side of the cassette 41 is flat and continuous it holds the pawl 47 out of the slideway 22 as the cassette 41 drops and while it is in the exposure position. A coil spring 52 housed within the bracket 50 bears against the opposite end of the pawl 47 and urges the pawl to assume the position shown in Fig. 7, a projection 49 being provided on the pawl to center the spring 52.

To move the pawl 47 and drop the film cassette 41 a conventional cable release 53, such as is used to actuate camera shutters, is employed. The outer sheath 54 of the release is attached to the bracket 50 while the inner movable element 55 extends through the bracket 50 so as to bear against the end of the pawl 47. The opposite end of the release 53 at which the push button 58 is located, is supported in a U-shaped slot 56 provided in the shield 57 attached to the side of the screen 14. The shield 57 supports the screen handle 31 and protects the operator's hands from the action of the X-rays. Thus, the push button 58 is conveniently mounted adjacent to one of the handles 31. When this button is pressed the movable element 55 of the cable release 53 bears against the pawl 47 compressing the spring 52 and moving the pawl 47 to withdraw the projection 51 and permit the cassette 41 to drop from the shielded position to the exposure position.

It will be appreciated by those familiar with the art that the cable release 53 may be mounted otherwise than as described above, depending upon the particular handle arrangement of the fluorescent screen in which it is to be used. In some instances it has proved desirable to substitute a lever arrangement or a pull string for the cable release. A cable release however, is preferred because of its compactness and simplicity.

Thus far the operation of the apparatus to move the film cassette has been described as it functions when the holder 11 is used in the vertical position.

In order to move the film cassette 41 from the shielded to the exposure position when the holder 11 is to be used in a horizontal or inclined position, an actuator mechanism 60 is provided. This mechanism comprises a hollow tube 61 supported on the patient's side of the cover plate 24, as shown in Fig. 4. A coil spring 62 and one end of a plunger element 63 are housed within this tube. The plunger element 63 consists of a single piece of thin rod which is bent near its center to form a hand loop 64.

One end of the rod 63 extends downwardly into the tube 61 and the other end extends downwardly on the opposite side of the frame 20 to bear against the top of the cassette 41 when the mechanism 60 is in use. A washer 65 is attached, by peening, to the end of the rod 63 which is housed within the tube 61. The end of the spring 62 bears against this washer and urges the rod 63 downwardly. The upper end of the tube 61 is closed by a cap 66 having an opening 67 through which the rod 63 passes. Thus, the plunger element 63 is held in alignment by the cap 66 and the washer 65. The other end of the plunger 63 bears against the top of the film cassette 41 urging it to move to the exposure position as the spring 62 tends to move the plunger 63 downwardly. This causes the film cassette 41 to move to the exposure position regardless of the inclination film holder 11. Downward movement of the cassette 41 past the exposure position, whether due to the force of the plunger 63 or to gravity, is prevented by a resilient stop button 69 mounted on a bracket 68 attached to the frame 20.

When the film holder 11 is used in the vertical position it is preferred not to use the actuator mechanism 60, gravity alone causing movement of the cassette into the exposure position, when the cable release 53 is actuated.

To make the actuator mechanism inactive so that the cassette 41 may be inserted or removed or the device used in the vertical position, the handle 64 is pulled upwardly until the plunger 63 is above the top of the frame 20 and rotated moving the end of the plunger 63 to the patient's side of the frame 20. The upward pull on the handle 64 is then released allowing the mechanism 60 to assume the position shown in Fig. 2 with the plunger 63 out of contact with the top of the film cassette 41.

If desired, of course, the actuator mechanism 60 may also be used when the patient is standing and the holder 11 is vertical, but this imposes an additional strain on the cassette 41 when it drops to the exposure position. In some instances, where the device is to be used solely for making X-ray examinations of patients who are standing erect, the plunger mechanism 60 may be eliminated entirely.

The film holder of this invention is preferably operated as follows: The patient is placed either upon or against the table 12 as desired, and the X-ray generator 13 is moved to a position directly behind that part of the body 16 which is to be examined. The screen 14 is swung into position opposite the generator 13, and a foot switch (not shown) is actuated to energize the generator to produce a shadow graph on the screen 14. After preliminary examination shutters within the generator are moved to narrow the field.

When these adjustments are completed the generator is turned off, and the film holder 11 is hung on the fluorescent screen 14, as shown in Fig. 1, by means of the hooks 36 and 37, the film cassette 41, which has been previously loaded with film, having been inserted in the slideways 22. The technician or physician then reenergizes the generator 13 and examines the particular area of the patient's body which appears behind the pressure element 30. This is the area which will be photographed. The fluorescent screen 14 is then moved, by means of the handles 31, to force the pressure element 30 into the patient's body and permit the physician or technician to manipulate the body until the precise portion that he desires to examine or photograph is shown on the screen.

When the conditions are deemed to be proper for photographing the foot switch is released to deenergize the generator, and the push button 58 is actuated to withdraw the pawl 47 and permit the cassette to slide into the exposure position. Immediately after the cassette 41 is in position another switch (not shown) is actuated which increases the current supply to the X-ray tube to a higher value to increase the radiation and expose the photographic plate. Conventional X-ray machines are arranged to operate on about 5 milliamperes current for fluoroscopic examination and on 60 or 100 milliamperes current for making photographs. This is done to shorten the exposure time.

As soon as the exposure is completed, the timing being automatic in most machines, the return handle 44 is raised to lift the film cassette back to the shielded position where it is retained by the pawl 47. In the embodiment illustrated the cassette 41 may then be turned end for end and the opposite end of the film exposed in the same fashion making it possible to take two pictures in quick succession. This is particularly desirable for an immediate check is made, and the physician has two pictures to examine each of which shows substantially the same condition. Thus, imperfections due to the film or its development may be quickly identified as such with little likelihood of their being mistaken for a pathological condition.

The relative location and size of the opening 27 in the lead shield 23 with respect to the length of the cassette 41 wherein the length of the cassette 41 is substantially twice the diameter of the opening 27, results in the cassett 41 being reversible to make two exposures.

In some instances it has proved desirable to employ a smaller cassette 41 or a larger opening 27 and pressure element 30, taking only a single exposure with each cassette. In another embodiment, adapted particularly for taking X-ray photographs of the thorax, the pressure element 30 was eliminated and the opening 27 was made rectangular in shape and substantially larger than that of the preferred embodiment.

The modified holder was of such width as to receive the cassette with its long dimension horizontal rather than vertical, and the opening in the lead shield corresponded to the full area of the photographic plate in the cassette. The slideways for the cassette extended the full length of the holder, and a second pawl at the bottom of the exposure opening was substituted for the return rod 42 and the stop 57.

To use the modified holder the cassette was inserted in the top of the holder, being retained in the shielded position by the upper pawl. The preliminary fluoroscopic examination could then be made, and, when conditions were satisfactory, the upper pawl could be withdrawn to drop the cassette to the lower pawl in the exposure position. When the exposure was completed the operator then actuated the lower pawl to release the cassette which dropped out of the slideways into his hand.

From the foregoing it will be seen that the holder of this invention not only greatly simplifies the technique of making X-ray photographs in conjunction with fluoroscopic examinations but also improves the quality of the photographs which result, making it possible for the physician to make a more accurate and reliable diagnosis.

Various changes and modifications in addition to those set forth herein such as the provision of a detachably mounted pressure element or the adaptation of the holder to other kinds of X-ray apparatus, etc., may be made without departing from the spirit of this invention whose scope is commensurate with the following claims.

What is claimed is:

1. A cassette holder adapted to be supported on the X-ray generator side of a fluorescent screen comprising an elongated plate of a material impervious to X-rays, means for securing said plate to said screen in such fashion that the plate extends downwardly from a point above the screen to a point near the center thereof, a pair of vertical cassette slideways spaced apart a distance substantially equal to the width of a film cassette, said plate having an aperture near the center of said screen, the aperture being of a height less than one-half the length of the film cassette, a retractable pawl normally projecting into one of said slideways approximately at the top of said aperture, means at the bottom of said slideways for limiting downward motion of said cassette, and manually actuated means for raising said cassette from its lowermost position to a second position wherein its lower edge is retained on said retractable pawl, the height of said plate above the pawl being such that the film in the cassette is protected by the plate yet the top edge of the cassette is readily accessible so that the cassette may be manually lifted out of the slideways and reversed therein.

2. A cassette holder adapted to be supported on the X-ray generator side of a fluorescent screen comprising an elongated plate of a material impervious to X-rays, means for securing the plate in a fixed position on said screen with the plate extending downwardly from a point above the screen to a point near the center thereof, a pair of vertical slideways spaced apart a distance substantially equal to the width of a film cassette, said plate having an aperture near the center of said screen, the aperture being of a height less than one-half the length of the film cassette, a retractable pawl normally projecting into one of said slideways approximately at the top of said aperture, means at the bottom of said slideways for limiting downward motion of said cassette, and manually actuated means for raising said cassette from its lowermost position to a second position wherein its lower edge is retained on said retractable pawl.

3. A cassette holder adapted to be supported on the X-ray generator side of a fluorescent screen comprising an elongated plate of a material impervious to X-rays, means for securing the plate in a fixed position on said screen with the plate extending downwardly from a point above the screen to a point near the center thereof, a pair of vertical slideways spaced apart a distance substantially equal to the width of a film cassette, said plate having an aperture near the center of said screen, the aperture being of a height less than one-half the length of the film cassette, a retractable pawl normally projecting into one of said slideways approximately at the top of said aperture, and means at the bottom of said slideways for limiting downward motion of said cassette.

4. A cassette holder adapted to be supported on the X-ray generator side of a fluorescent screen comprising an elongated plate of a material impervious to X-rays, means for securing the plate in a fixed position on said screen with the plate extending downwardly from a point above the screen to a point near the center thereof, a pair of vertical slideways for slidably retaining a film cassette, said plate having an aperture near the center of said screen, the aperture being of a height less than one-half the length of the film cassette, a releasable means for preventing downward motion of the cassette disposed approximately at the top of said aperture, a stop at the bottom of said slideways for limiting downward motion of said cassette, and manually actuated means for raising said cassette from its lowermost position to a second position wherein it is retained by said releasable means.

5. A cassette holder adapted to be supported on the X-ray generator side of a fluorescent screen comprising a frame, means for supporting the frame upon the screen with the top of the frame projecting above the screen, a plate of material impervious to X-rays fixed to said frame and extending downwardly to a point adjacent the center of said screen, a pair of vertically extending slideways disposed between said plate and the screen for slidably supporting a film cassette, and manually actuated means for moving the cassette in the slideways, said cassette being movable from an upper position behind the plate to a lower position where it is not shielded by said plate and the upper end of said cassette being readily accessible above the top of the screen when in said upper position.

6. A cassette holder adapted to be supported on the X-ray generator side of a fluorescent screen comprising a frame, means for supporting the frame upon the screen with the top of the frame projecting above the screen, a plate of material impervious to X-rays fixed to said frame and extending downwardly to a point adjacent the center of said screen, a pair of vertically extending slideways disposed between said plate and the screen for slidably supporting a film cassette, releasable means for supporting said cassette in an upper position, stop means for retaining the cassette in a lower position where it is not shielded by said plate, and means for raising said cassette from the lower to the upper position, the location of the various elements being such that the upper end of said cassette is readily accessible above the top of the screen when in said upper position.

7. A cassette holder adapted to be supported on the X-ray generator side of a fluorescent screen comprising a frame, means for supporting the frame upon the screen with the top of the frame projecting above the screen, a plate of material impervious to X-rays supported upon said frame in a fixed position with respect to said screen and extending downwardly to a point adjacent the center of said screen, and a pair of vertically extending slideways disposed between said plate and the screen for slidably supporting a film cassette, said cassette being movable from an upper position behind the plate to a lower position where it is not shielded by said plate and the relationship of the various elements being such that the upper end of said cassette is readily accessible when in said upper position.

8. A cassette holder adapted to be supported on the X-ray generator side of a fluorescent screen comprising a frame, means for supporting the frame upon the screen with the top of the frame projecting above the screen, a plate of material impervious to X-rays supported upon said frame in a fixed position with respect to said screen and extending downwardly to a point adjacent the center of said screen, a pair of vertically extending slideways disposed between said plate and the screen for slidably supporting a film cassette, releasable means for retaining said cassette in an upper position behind the plate, stop means for retaining the cassette in a lower position where it is not shielded by said plate, and a projection supported on said frame, the projection being so located as to extend outwardly from that portion of said frame disposed at the center of the fluorescent screen when the holder is mounted on the screen at the middle thereof.

PATRICK C. RENNER.

REFERENCES CITED

The following references are of record in the file of this patent:

UNITED STATES PATENTS

| Number | Name | Date |
|---|---|---|
| 2,144,114 | Lehoczky | Jan. 17, 1939 |
| 2,174,738 | Eddy | Oct. 3, 1939 |
| 2,184,962 | Scholz | Dec. 26, 1939 |
| 2,291,139 | Borthwick | July 28, 1942 |